(12) United States Patent
Narasimhan et al.

(10) Patent No.: US 10,552,613 B2
(45) Date of Patent: Feb. 4, 2020

(54) SECURE FIRMWARE DEVICES AND METHODS

(71) Applicant: INTEL CORPORATION, Santa Clara, CA (US)

(72) Inventors: Krishnakumar Narasimhan, Beaverton, OR (US); Sudhakar Otturu, Portland, OR (US); Karunakara Kotary, Portland, OR (US); Vincent J. Zimmer, Tacoma, WA (US)

(73) Assignee: INTEL CORPORATION, Santa Clara, CA (US)

( * ) Notice: Subject to any disclaimer, the term of this patent is extended or adjusted under 35 U.S.C. 154(b) by 316 days.

(21) Appl. No.: 15/715,773

(22) Filed: Sep. 26, 2017

(65) Prior Publication Data

US 2019/0095623 A1 Mar. 28, 2019

(51) Int. Cl.
*G06F 21/57* (2013.01)
*G06F 21/44* (2013.01)
*G06F 21/62* (2013.01)
*G06F 8/65* (2018.01)

(52) U.S. Cl.
CPC ............ *G06F 21/572* (2013.01); *G06F 21/44* (2013.01); *G06F 21/6209* (2013.01); *G06F 8/65* (2013.01)

(58) Field of Classification Search
CPC .................................. G06F 8/65; G06F 21/572
See application file for complete search history.

(56) References Cited

U.S. PATENT DOCUMENTS

| 2009/0007089 A1* | 1/2009 | Rothman | ................... G06F 8/65 717/168 |
| 2009/0249320 A1* | 10/2009 | Su | ............................ G06F 8/65 717/168 |
| 2017/0115984 A1* | 4/2017 | Lu | ........................... G06F 21/51 |

OTHER PUBLICATIONS

"Pre-EFI (PEI) Technical Overview", Intel Corporation, 2006-2009, 60 pages.

(Continued)

*Primary Examiner* — Albert Wang
(74) *Attorney, Agent, or Firm* — Finch & Maloney PLLC

(57) ABSTRACT

A computing device that implements a secure and transparent firmware update process is provided. The computing device includes a secure memory area and a secure device that separately executes firmware updates in parallel with other processes executed by a CPU. The secure memory area may be allocated by the CPU and/or a memory controller using any of a variety of memory protection techniques. System software executed by the CPU receives update firmware requests from a trusted source, stores a firmware payload included in these requests in the secure memory area, and executes the next scheduled process. Firmware executed by the secure device retrieves the firmware payload from the secure memory area, authenticates the firmware payload, and applies the firmware payload to a firmware storage device. The secure device performs these acts transparently from the point of view of the CPU, these avoiding consumption of resources of the CPU.

24 Claims, 6 Drawing Sheets

(56) References Cited

OTHER PUBLICATIONS

"ACPI Component Architecture User Guide and Programmer Reference", Intel Corporation, Nov. 7, 2014, 171 pages, rev. 5.26.
"Unified Extensible Firmware Interface Specification", Unified EFI Forum, Inc., 2017, pp. 1-172; 331-489, version 2.7.
"Intel Virtualization Technology for Directed I/O", Intel Corporation, Jun. 2016, pp. 1-51, rev. 2.4.
"eMMC Security Features", Micron, Apr. 1, 2016, pp. 1-15.

* cited by examiner

SECURE FIRMWARE DEVICES AND METHODS

BACKGROUND

In general, firmware changes less frequently than other software components of a computing device. This fact, coupled with the risk involved in updating existing firmware due to its foundational nature, has retarded development of firmware update tools in comparison to tools used to update software components such as operating systems and user applications. Conventional firmware update tools require a computing device to execute a specialized boot process to update device firmware. As part of this boot process, a central processing unit (CPU) of the computing device reads, prior to executing existing device firmware, a firmware update and writes the firmware update to a storage location identified as storing device firmware. After the firmware update is stored to the identified storage location, the CPU can execute the updated device firmware as part of further boot processing.

DETAILED DESCRIPTION

Figure 1:
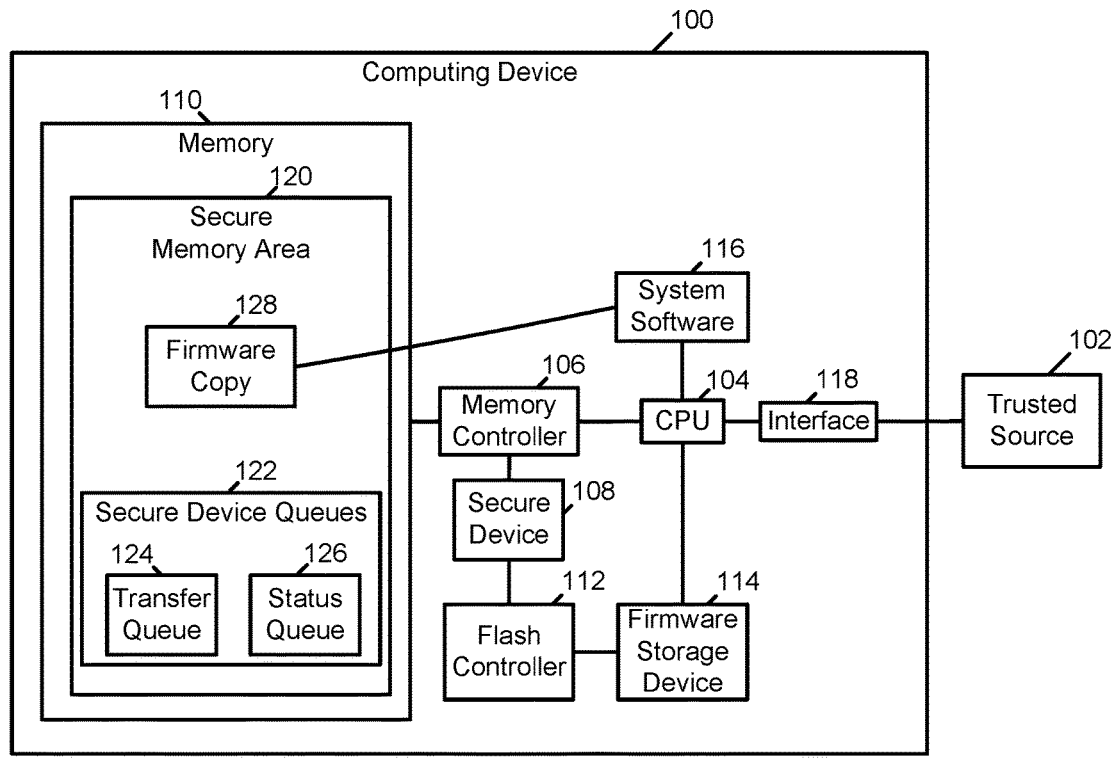
FIG. 1 is a block diagram illustrating a computing device including a secure firmware device configured in accordance with an example of the present disclosure.

The systems and methods disclosed herein securely and transparently update firmware of a computing device. In some examples, to support secure and transparent firmware updates, the computing device includes enhanced firmware, enhanced system software, and a secure device with data processing capacity. In these examples, the secure device is disposed upon a motherboard of the computing device and is directly or indirectly coupled to a memory controller and a firmware storage device. The memory controller is coupled to memory and coupled to (or integrated with) a CPU. The CPU is coupled to the firmware storage device and is configured to read and execute the enhanced firmware stored therein.

In some examples, during execution of the enhanced firmware, the CPU allocates, via the memory controller, a secure memory area within the memory. The CPU next stores a copy of the enhanced firmware in the secure memory area. To conserve power and increase security, the CPU powers down the firmware storage device after storing the copy of the enhanced firmware in the secure memory area. The CPU also allocates a transfer queue and a status queue for communicating with the secure device in the secure memory area and boots the computing device to the enhanced system software. The enhanced system software may include, for example, an enhanced operating system.

In some examples, during execution of the enhanced system software, the CPU processes a firmware update request received from a trusted source. The firmware update request may include a firmware payload to be applied by the secure device to the enhanced firmware stored on the firmware storage device. The CPU parses the firmware payload and stores the firmware payload in the secure memory area. Next, the CPU determines whether platform conditions associated with the firmware update request are satisfied. If so, the CPU updates the transfer queue. Otherwise, the CPU stores the firmware payload in a predetermined location for subsequent processing. In either case, the CPU executes the next scheduled process.

In some examples, during execution of its firmware, the secure device periodically polls, via the memory controller, the transfer queue to determine whether the CPU has queued any tasks. Where the secure device identifies a firmware update task, the secure device attempts validate the authenticity of the payload (e.g., via a signed certificate or some other authentication mechanism). Where the secure device determines that the payload is authentic, the secure device parses the payload, enables the firmware storage device, updates the enhanced firmware with the payload, and updates the status queue to indicate the firmware update succeeded. Where the secure device determines that he payload is not authentic, the secure device updates the status queue to indicate the firmware update failed. In either case, the secure device next notifies the system software that the status queue has been updated (e.g., via an interrupt).

Still other aspects, examples and advantages are discussed in detail below. Moreover, it is to be understood that both the foregoing information and the following detailed description are merely illustrative examples of various aspects and examples, and are intended to provide an overview or framework for understanding the nature and character of the claimed aspects and examples. References to "an example," "other examples," "some examples," "some examples," "an alternate example," "various examples," "one example," "at least one example," "another example," "this and other examples" or the like are not necessarily mutually exclusive and are intended to indicate that a particular feature, structure, or characteristic described in connection with the example may be included in at least one example. The appearances of such terms herein are not necessarily all referring to the same example. Any example disclosed herein may be combined with any other example.

Also, the phraseology and terminology used herein is for the purpose of description and should not be regarded as limiting. Any references to examples, components, elements, or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

General Overview

Conventional techniques for updating device firmware include both proprietary techniques and techniques based on standards, such as the standard defined by the Unified Extensible Firmware Interface (UEFI) specification. While these conventional techniques provide certain advantages (e.g., central processing unit (CPU) independent architecture and drivers, backward compatibility between versions, etc.), they also have disadvantages. For instance, the capsule update mechanism defined in the UEFI specification executes multiple system resets when applying firmware updates. This behavior introduces a risk of corrupting the firmware and, hence, comprising the system applying the firmware update. Proprietary solutions often leave firmware technology unlocked, and thus insecure. Additionally, both standard and proprietary conventional techniques utilize the CPU of the system to apply firmware updates, thereby consuming its resources, which could be applied elsewhere.

Thus, and in accordance with at least some examples disclosed herein, a computing device implements a secure and transparent firmware update process using a secure memory area and a secure device that separately executes firmware updates in parallel with other processes executed by a CPU. The secure memory area may be allocated by the CPU and/or a memory controller coupled to or integrated with the CPU using any of a variety of memory protection techniques. System software executed by the CPU receives update firmware requests from a trusted source, stores a firmware payload included in these requests in the secure memory area, and executes the next scheduled process. Firmware executed by the secure device retrieves the firmware payload from the secure memory area, authenticates the firmware payload, and applies the firmware payload to a firmware storage device. The secure device performs these acts transparently from the point of view of the CPU, these avoiding consumption of resources of the CPU.

System Architecture

FIG. 1 illustrates a computing device 100 configured to securely and transparently process firmware update requests received from a trusted source 102. The trusted source 102 may include secure files, data storage media, a trusted execution environment, and/or a trusted endpoint device. As shown in FIG. 1, the computing device 100 includes a CPU 104, a memory controller 106, a secure device 108, memory 110, a flash controller 112, a firmware storage device 114, and an interface 118. The memory 110 includes a secure memory area 120. The secure memory area 120 includes secure device queues 122 and a copy of firmware 128 (e.g., a copy of the firmware 200 described further below with reference to FIG. 2). The secure device queues include a transfer queue 124 and a status queue 126. As also shown in FIG. 1, the CPU 104 is configured to implement system software 116 (e.g., an operating system).

In FIG. 1, the CPU 104 includes various computing circuitry, such as a control unit, an arithmetic-logic unit, and register memory, that can execute instructions defined by an instruction set supported by the CPU 104. In executing the instructions, the CPU 104 may operate on data stored in the register memory thereby generating manipulated data. The CPU 104 may include a single core processor, a multi-core processor, a micro-controller, or some other data processing device.

As illustrated in FIG. 1, the CPU 104 is coupled to the interface 118. The interface 118 includes a physical connector (e.g., a network port, universal serial bus port, or some other connector), circuitry coupled to the physical connector (e.g., a controller or other data processing device), and/or a software stack (e.g., drivers) configured to drive operation of the interface 118. As such, the interface 118 may include one or more types of interface devices such as input devices, output devices, and combination input/output devices. For example, the interface 118 may be a network interface card, USB card, or other device configured to communicate information with including data storage media (or other memory) and/or other computing devices.

As shown in FIG. 1, the CPU 104 is coupled to the firmware storage device 114. The firmware storage device 114 includes non-volatile storage (e.g., an erasable programmable read-only memory, flash memory, or the like) that is sized to store firmware (e.g., a basic input/output system) for the computing device 100. One example of firmware stored in the firmware storage device 114 is described further below with reference to FIG. 2.

In some examples, the CPU 104 and the secure device 108 are configured to enable and disable power to the firmware storage device 114. In these examples, the CPU 104 is configured to read the firmware, which may include firmware code and variables, from the firmware storage device 114 and to execute the firmware code as part of an overall boot process for the computing device 100. One example of such a boot process is described in detail below with reference to FIG. 3.

In some examples illustrated by FIG. 1, the system software 116 is configured to receive, via the interface 118, and process firmware update requests from the trusted source 102. When executing according to this configuration in some examples, the system software 116 queues the update request for processing by the secure device 108 prior to executing other processes parallel to the firmware update process executed by the secure device 108. One example of a firmware queueing process executed by the system software is described in detail below with reference to FIG. 4.

As illustrated in FIG. 1, in some examples, the system software 116 is configured to access the copy of the firmware 128 when servicing system function calls that are implemented in firmware. This access may include reading from the copy of the firmware 128 and writing (e.g., non-volatile variables) to the copy of the firmware 128. Any changes made to the copy of the firmware 128 in servicing of firmware function calls are stored and flushed to the firmware storage device 114 during shutdown of the computing device 100. Similarly, in some examples, changes made to shadow copies of device translation information may be stored in the secure memory area and may be used to update the firmware stored in the firmware storage device 114 during shutdown of the computing device. Thus the copy of the firmware and other information stored in the secured memory area enable the firmware stored in the firmware storage device to be updated at any time without causing concurrency or version mismatch errors.

As shown in FIG. 1, the secure device 108 is coupled to the memory controller 106 and the flash controller 112. Like the CPU 104, the secure device 108 is a data processing device and includes computing circuitry that can execute instructions. The secure device 108 may include, for example, a control unit, an arithmetic-logic unit, and register memory. Additionally or alternatively, the secure device 108 may include an application specific integrated circuit, field programmable gate array, microcontroller, or some other data processing device. In some examples, the secure device 108 is configured to securely and transparently update firmware executed by the CPU 104. One example of a firmware update process executed by the secure device 108 in this configuration is described in detail further below with reference to FIG. 5.

In at least some examples illustrated by FIG. 1, the flash controller 112 is coupled to the secure device 108 and the firmware storage device 114. In these examples, the secure device 108 is configured to control the flash controller 112. The flash controller 112, in turn, is configured to erase existing firmware stored in the firmware storage device 114 and to write new firmware (e.g., as may be included in firmware update requests) to the firmware storage device 114.

As shown in FIG. 1, the memory controller 106 is coupled to the CPU 104, the secure device 108, and the physical memory 110. The memory controller includes circuitry configured to enable the CPU 104 and the secure device 108 to read and write data to the physical memory 110. The physical memory 110 may incorporate volatile and/or non-volatile data storage (e.g., read-only memory, random access memory, flash memory, magnetic/optical disk, and/or some other computer readable and writable medium). The physical memory 110 is sized and configured to store programs executable by the CPU 104 and/or the secure device 108 and, in some examples, some of the data used by the programs during execution.

In some examples, the CPU 104 allocates the secure memory area 120 and the secure device queues 122 via the memory controller 106 as part of the boot processes described herein. The secure memory area 120 may be a chipset protected buffer or a buffer that can only be accessed by software executing under a predetermined privilege level. In these examples, the secure memory area 120 is used to store firmware update requests prior to execution of a firmware update by the secure device 108. The secure device queues 122 are maintained to enable communication between the CPU 104 and the secure device 108. The secure device queues 122 are referenced and updated by the secure device 108 during firmware update processing as described further below.

The secure memory area 120 may be protected using any of a variety of software and/or hardware memory protection techniques. For example, where the memory controller 106 supports hardware assisted remapping, such as INTEL Virtualization Technology for Directed Input/Output (I/O), the system software 116 may instruct the CPU 104 to create the secure memory area 120 as a protection domain assigned to the secure device 108. In these examples, the system software 116 and the secure device 108 are able to access the secure memory area 120, but other software or other I/O devices are not. Other types of protection techniques may be used to allocate the secure memory area 120, and the examples disclosed herein are not limited to a particular type of protection technique.

Figure 2:
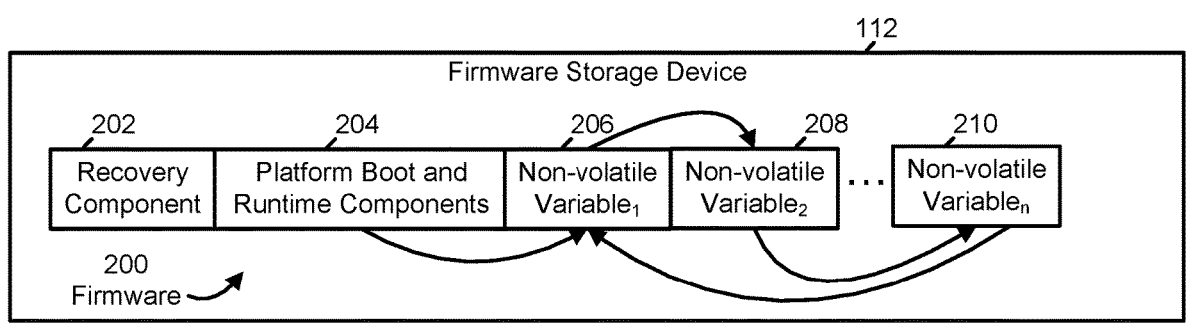
FIG. 2 is a block diagram illustrating a secure firmware device in accordance with an example of the present disclosure.

FIG. 2 illustrates firmware 200 stored within the firmware storage device. As shown in FIG. 2, the firmware 200 includes a recovery component 202, a platform boot and runtime components 204, and a set of non-volatile variables include members 1 through n. The platform boot and runtime components 204 stores firmware code that is read and executed by the CPU 104 during normal boot processing. During normal boot processing, the platform boot and runtime components 204 reads and processes the set of non-volatile variables to initiate platform hardware and to expose the platform hardware to the system software 116.

The recovery component 202 stores firmware code that is read and executed by the CPU 104 during recovery boot processing. The recovery component 202 identifies a targeted subset of the hardware platform (e.g., the memory controller 106 and particular I/O devices, such as a screen interface and a keyboard interface) and exposes this targeted subset to the system software 116 for purposes of remediating hardware and/or firmware conditions that lead to an unrecoverable error in normal boot processing.

Methodology

Figure 3:
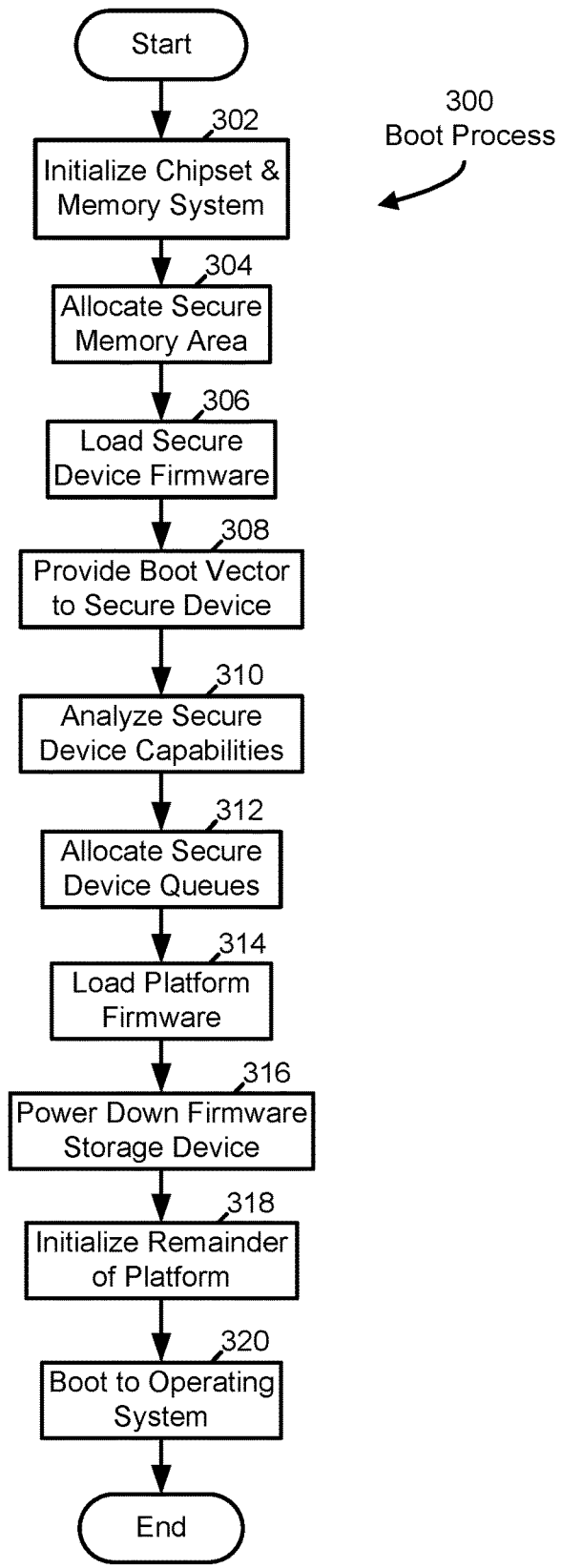
FIG. 3 is a flow chart illustrating a boot process in accordance with an example of the present disclosure.

Some examples disclosed herein execute a boot process, such as the boot process 300 illustrated in FIG. 3. The boot process 300 may be executed by a computing device, such as the computing device 100 described above with reference to FIG. 1. The acts executed by the boot process 300 collectively initiate operation of the computing device 100 in a manner that enables subsequent secure and transparent updating of firmware of the computing device 100.

As illustrated in FIG. 3, the boot process 300 starts in act 302 with a CPU (e.g., the CPU 104) receiving power and initializing a chipset (e.g., a northbridge) to which it is coupled, a memory controller (e.g., the memory controller 106), and memory (e.g., the memory 110). During this initialization process, the CPU reads firmware (e.g., the firmware 200) from a firmware storage device (e.g., the firmware storage device 114) and executes the firmware to gain access to the memory via the memory controller. Next, the CPU enters a privilege level (e.g., privilege level 0) sufficient to execute instructions to create a secure memory area (e.g. the secure memory area 120). Also, during the act 302, the memory controller implements memory address translation (e.g., via extended page tables) to service memory access requests by the CPU and platform devices coupled to the chipset (e.g., via a southbridge).

In act 304, the CPU interacts with the memory controller to allocate the secure memory area. Allocation of the secure memory area may be accomplished using a number of hardware and/or software memory protection techniques, such as INTEL Virtualization Technology for Directed I/O, enclaves, platform specific drives (e.g., system management mode handlers), and the like. In act 306, the CPU loads firmware to be executed by a secure device (e.g., the secure device 108) into the secure memory area. In act 308, the CPU transmits the boot vector for the secure device firmware to the secure device. In act 310, the CPU communicates with the secure device to determine its capabilities and support requirements (e.g., requested queues, etc.). For instance, in some examples, the secure device may implement security protections such as a write protection, password lock, and replay protected memory blocks. In act 312, the CPU allocates queues (e.g., the secure device queues 122) utilized by the secure device.

In act 314, the CPU stores a copy of the firmware (e.g., the copy of the firmware 128) within the secure memory area and, in some examples, calculates a hash over the copy that can be later validated as a security measure. As described above, in some examples, the copy of the firmware within the secure memory area is used by the system software to service firmware requests (e.g. system function calls to firmware functions). In act 316, having copied the contents of the firmware storage device to the secure memory area, the CPU powers down the firmware storage device. In act 318, the CPU detects remaining platform devices (e.g., I/O devices coupled to the southbridge) and configures these platform devices for operation. In act 320, the CPU boots to the operating system (as may be part of the system software 116) and the boot process 300 ends.

Figure 4:
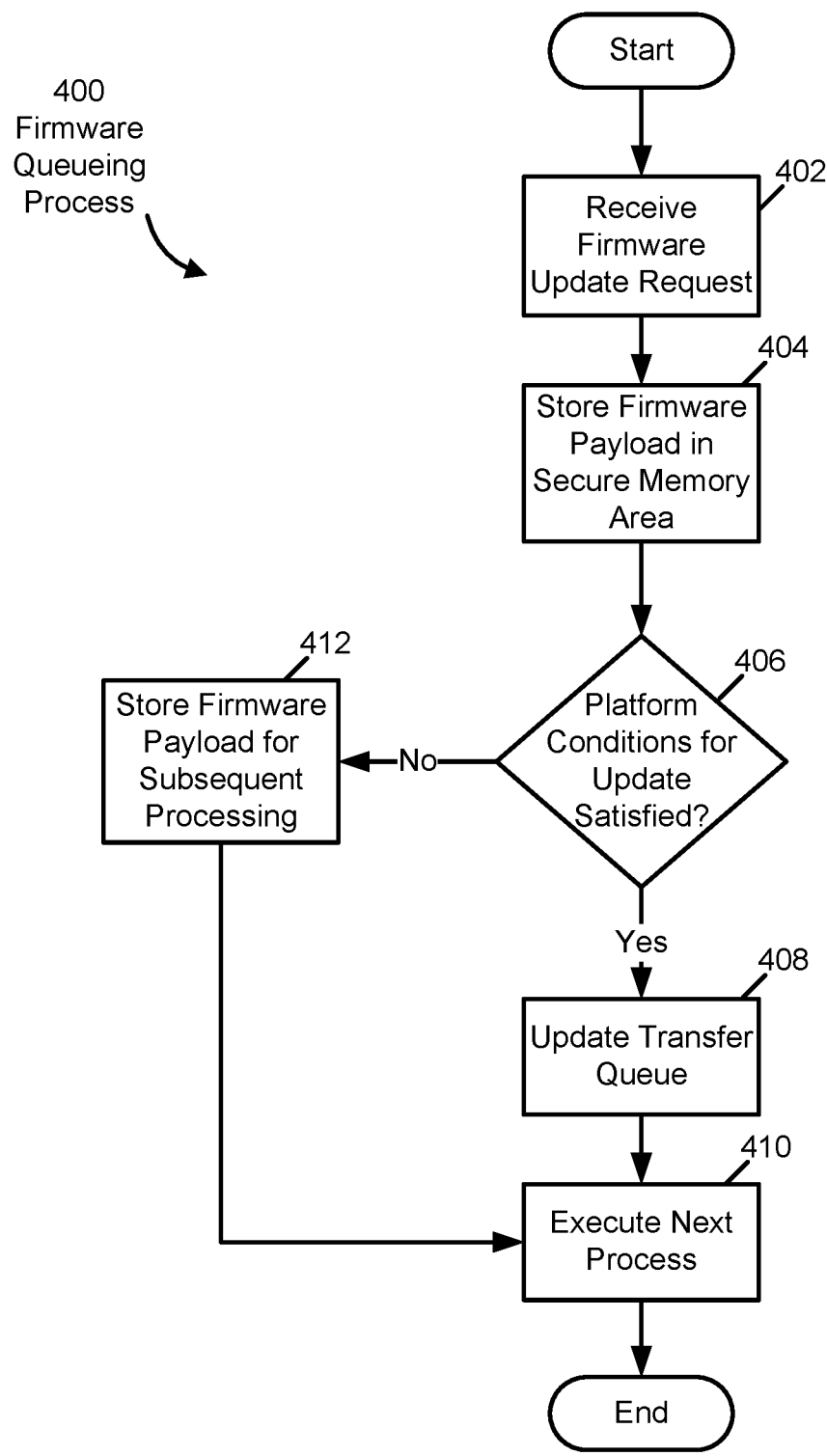
FIG. 4 is a flow chart illustrating a firmware queueing process in accordance with an example of the present disclosure.

In support of secure and transparent firmware updates, some examples disclosed herein execute a firmware queueing process, such as the firmware queueing process 400 illustrated in FIG. 4. The firmware queueing process 400 may be executed by a computing device, such as the computing device 100 described above with reference to FIG. 1. The acts executed by the firmware queueing process 400 collectively initiate a transparent and secure firmware update.

As illustrated in FIG. 4, the firmware queueing process 400 starts in act 402 with system software (e.g., the system software 116) receiving a firmware update request from a trusted source (e.g., the trusted source 102). This firmware update request may include a header and a payload. The header may include version information specifying platforms for which the firmware update is compatible. The payload may include a recovery component (e.g., the recovery component 202), a platform boot component (e.g., the platform boot component of the platform boot and runtime components 204), and a set of default non-volatile variables (e.g., non-volatile variable$_1$ 206 through non-volatile variable$_n$ 210). In some examples, the payload is stored binary large object (BLOB).

In act 404, the system software parses the firmware update request and stores the payload in the secure memory area. In at least one example, to perform this storage operation, the kernel of the system software executes a device driver for the secure device and reports the payload to the device driver via an APCI device object. In other examples, the system software stores the payload in the secure memory area via other processes. Thus, the examples disclosed herein are not limited to a particular storage approach or operation.

In act 406, the system software determines whether platform conditions (e.g., version, state, etc.) for the update are satisfied. This determination may include authentication of the firmware update request, attestation performed as to the state of the computing device, and other security and integrity measures. If the platform conditions are satisfied, the system software executes act 408. Otherwise the system software executes act 410.

In the act 408, the system software updates a transfer queue within the secure device queues with a record indicating that the firmware payload is ready for processing. This record may indicate the firmware payload is ready for processing by including a particular value within a status_id field of the record. In the act 412, the system software stores the payload for subsequent processing. Storage of the payload for subsequent processing may involve movement of the firmware update request from the secure memory area to another secure data storage location.

In act 410, the system software executes the next scheduled process, and the firmware queueing process 400 ends. The act 410 is of particular significance in that it illustrates the transparency of the firmware update processes disclosed herein. By executing the next process in the act 410, the system software does not involve the CPU in direct application of the firmware update request. This frees the CPU to execute other processes in parallel with execution of firmware update process by the secure device.

Figure 5:
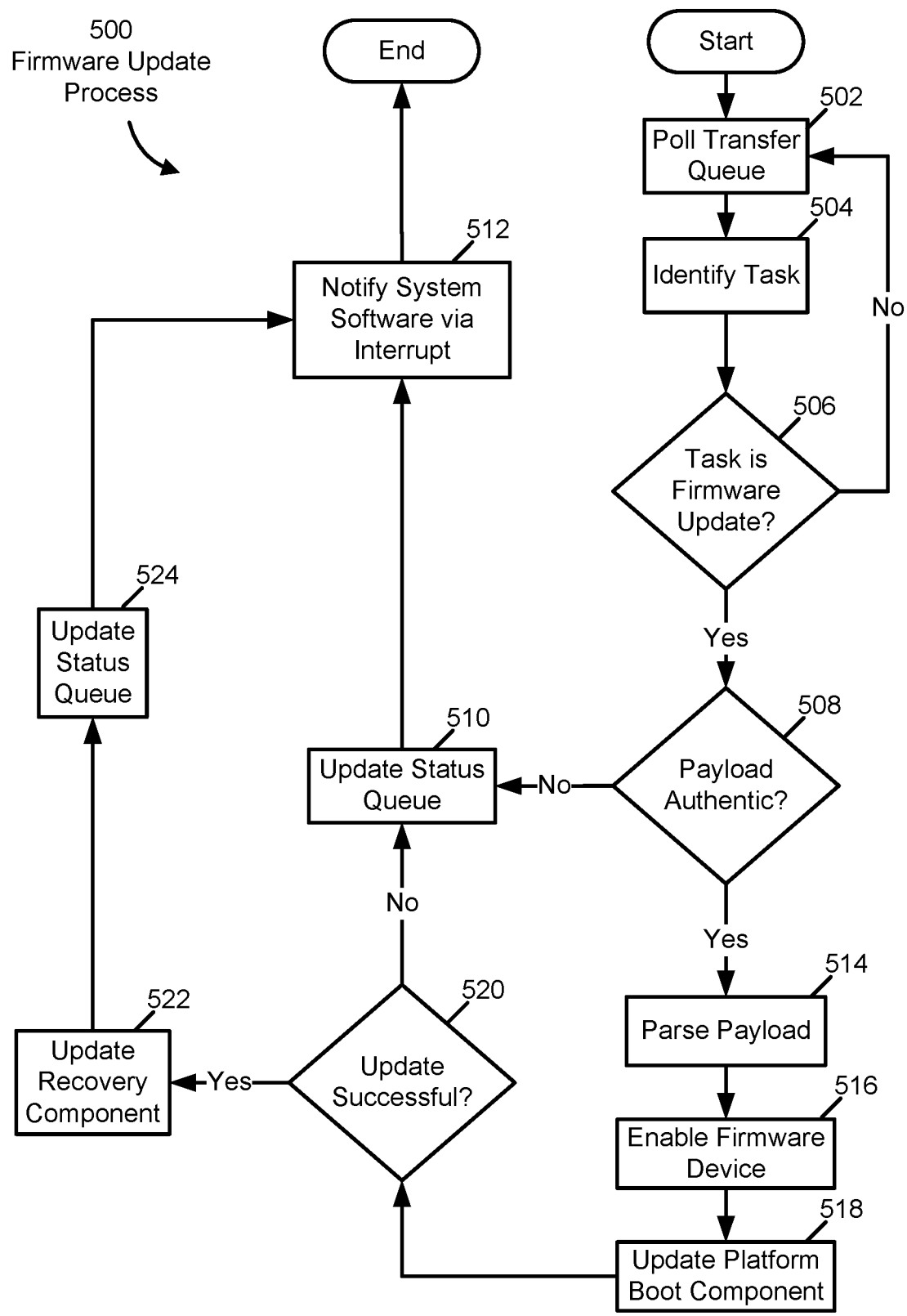
FIG. 5 is a flow chart illustrating a firmware update process in accordance with an example of the present disclosure.

Some examples disclosed herein execute a firmware update process, such as the firmware update process 500 illustrated in FIG. 5. The firmware update process 500 may be executed by a computing device, such as the computing device 100 described above with reference to FIG. 1. The acts executed by the firmware update process 500 collectively initiate a transparent and secure firmware update. In at least some examples, the acts included in the firmware update process 500 are executed by the secure device according to executable instructions specified by secure device firmware. In other examples, the acts included in the firmware update process 500 are executed by specialized hardware (e.g. an application specific integrated circuit) embedded in the secure device.

As illustrated in FIG. 5, the firmware update process 500 starts in act 502 with the secure device polling its transfer queue and retrieving a task record. In act 504, the secure device parses the task record to identify a task_id that indicates a task requested for execution. In act 506, the secure device determines whether a value stored the task_id field indicates a firmware update task has been requested. If so, the secure device executes act 508. Otherwise, the secure device returns to the act 502.

In the act 508, the secure device determines whether the payload is authentic (e.g., signed by the trusted source and/or having a calculated hash value equivalent to a hash value in the header). If so, the secure device executes act 514. Otherwise, the secure device executes act 510.

In the act 510, the secure device adds a record to a status queue (e.g., the status queue 126) that indicates the firmware update process 500 failed. In the act 512, the secure device notifies (e.g., via a software interrupt) the system software that a new status record is available in the status queue and the firmware update process 500 ends. In some examples, where the firmware update process 500 fails, within the act 512, the secure device updates the UEFI ESRT table to communicate the failure to the system software, rather than or in addition to adding a new status record to the status queue.

In the act 514, the secure device parses the payload. In act 516, the secure device powers on the firmware storage device. In act 518, the secure device transmits one or more control signals to a flash controller (e.g., the flash controller 112) to flash the firmware storage device and to store the platform boot component from the payload on the firmware storage device. In some examples of the act 518, the flash controller creates a separate partition (partition 0) within the firmware storage device, stores the platform boot component in this separate partition, and links the set of non-volatile variables to the platform boot component within the separate partition. It is appreciated that in the initial boot subsequent to updating the platform boot component, the CPU can execute the platform boot component using the set of non-volatile variables 206-210 (e.g., where the newly updated platform boot component supports the set of non-volatile variables) or the CPU can execute the platform boot component using default values (e.g., where the newly updated platform boot component does not support the set of non-volatile variables).

In act 520, the secure device determines whether the update of the platform boot component was successful. In one example, the secure device makes this determination by reading the newly stored platform boot component from the firmware storage device and comparing the result of the read to the platform boot component stored in the payload. If the update of the platform boot component was successful, the secure device executes act 522. Otherwise, the secure device executes the act 510.

In the act 522, the secure device transmits one or more control signals to a flash controller to store the recovery component from the payload on the firmware storage device. In some examples, the CPU loads the recovery component where a fault condition is encountered during execution of the act 518 as detected by the act 520. The recovery component utilizes the last known good set of non-volatile variables by traversing the partitions in the firmware storage device. In the act 524, the secure device adds a record to the status queue that indicates the firmware update process succeeded.

Processes 300-500 each depict one particular sequence of acts in a particular example. The acts included in these processes may be performed by, or using, one or more computing devices specially configured as discussed herein. Some acts are optional and, as such, may be omitted in accord with one or more examples. Additionally, the order of acts can be altered, or other acts can be added, without departing from the scope of the systems and methods disclosed herein.

Example Computing Devices

Figure 6:
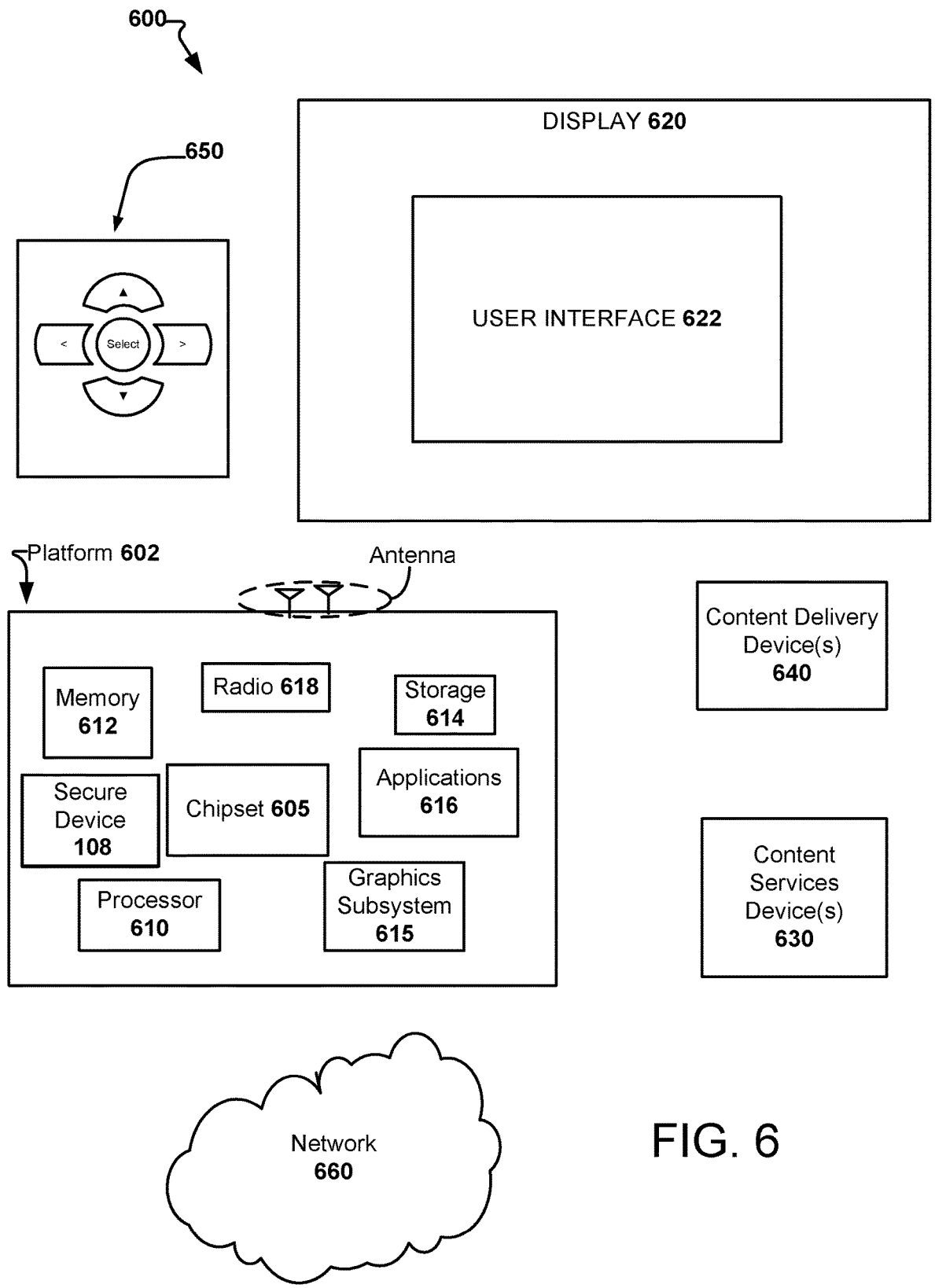
FIG. 6 illustrates computing devices configured in accordance with an example of the present disclosure.

FIG. 6 illustrates another example of a computing device, a computer system 600, configured in accordance with an example of the present disclosure. The system 600 may be incorporated into a personal computer (PC), laptop computer, ultra-laptop computer, all-in-one, cockpit defined computer system for automobiles, converged mobility device, wearable device, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some examples, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some examples, platform 602 may comprise any combination of a chipset 605, processor 610, memory 612, storage 614, graphics subsystem 615, the secure device 108, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some examples, processor 610 may comprise dual-core processor (s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques may be implemented in various hardware architectures. For example, graphics and/or video functionality may be integrated within a chipset. Alternatively, a discrete graphics and/or video processor may be used. As still another example, the graphics and/or video functions may be implemented by a general purpose processor, including a multi-core processor. In a further example, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some examples, display 620 may comprise any television or computer type monitor or display. Under the control of one or more software applications 616, platform 602 may display a user interface 622 on display 620.

In some examples, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some examples, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some examples, platform 602 may receive control signals from navigation controller 650 having one or more navigation features. The navigation features of controller 650 may be used to interact with user interface 622, for example. In some examples, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some examples, controller 650 may not be a separate component but integrated into platform 602 and/or display 620. Examples, however, are not limited to the elements or in the context shown or described herein, as will be appreciated.

In some examples, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chipset 605 may comprise hardware and/or software support for 5.1 surround sound audio and/or high definition 7.1 surround sound audio, for example. Drivers may include a graphics driver for integrated graphics platforms. In some examples, the graphics driver may comprise a peripheral component interconnect (PCI) express graphics card.

In various examples, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various examples, platform 602 and display 620 may be an integrated unit. Display 620 and content service device(s) 630 may be integrated, or display 620 and content delivery device(s) 640 may be integrated, for example. These examples are not meant to limit the present disclosure.

In various examples, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner. The examples, however, are not limited to the elements or context shown or described in FIG. 6.

Figure 7:
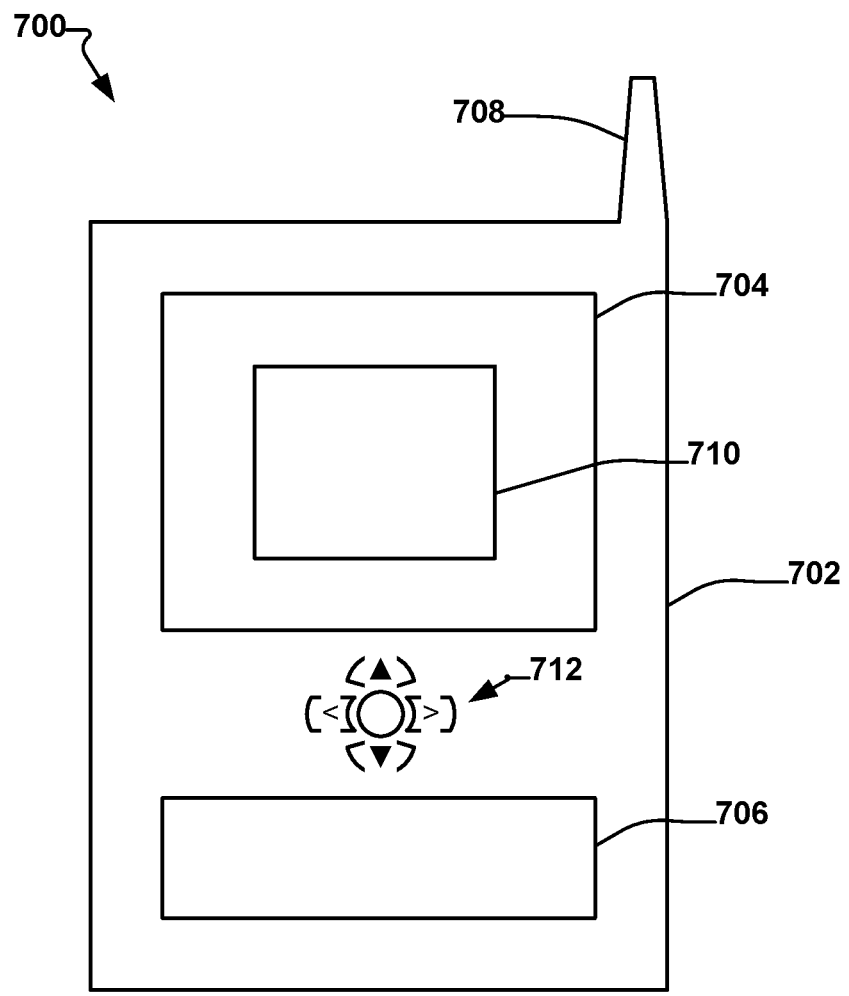
FIG. 7 illustrates a mobile computing system configured in accordance with an example of the present disclosure.

As described above, system 600 may be embodied in varying physical styles or form factors. FIG. 7 illustrates examples of a small form factor device 700 in which system 600 may be embodied. In some examples, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some examples, for example, a mobile computing device may be implemented as a smart phone capable of executing computer applications, as well as voice communications and/or data communications. Although some examples may be described with a mobile computing device implemented as a smart phone by way of example, it may be appreciated that other examples may be implemented using other wireless mobile computing devices as well. The examples are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device, such as user interface 710. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device. The examples are not limited in this context.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one example to the next in accordance with any number of factors, such as desired computational rate, power levels, heat tolerances, processing cycle budget, input data rates, output data rates, memory resources, data bus speeds and other design or performance constraints.

Some examples may be implemented, for example, using a non-transitory machine-readable medium or article or computer program product which may store an instruction or a set of instructions that, if executed by a machine, may cause the machine to perform a method and/or operations in accordance with an example of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Examples

The following examples pertain to further examples, from which numerous permutations and configurations will be apparent.

Example 1 is a computing device comprising a memory, a firmware storage device storing firmware, at least one central processing unit (CPU) coupled to the memory and the firmware storage device and configured to allocate, during execution of a boot process, at least one secure memory area within the memory; receive, after the execution of the boot process, a firmware update request comprising a firmware payload; and store the firmware payload in the at least one secure memory area; and at least one secure device coupled to the memory and the firmware storage device and configured to read the firmware payload from the at least one secure memory area and store at least one portion of the firmware payload in the firmware storage device.

Example 2 includes the subject matter of Example 1, wherein the at least one secure device is further configured to authenticate the firmware payload.

Example 3 includes the subject matter of either Example 1 or Example 2, wherein the at least one CPU is configured to allocate the at least one secure memory area at least in part by associating the at least one secure memory area with the at least one secure device via hardware assisted remapping.

Example 4 includes the subject matter of any of Examples 1-3, wherein the at least one CPU is further configured to store, during the execution of the boot process, a copy of the firmware in the at least one secure memory area and service firmware function calls by accessing the copy of the firmware.

Example 5 includes the subject matter of any of Examples 1-4, wherein the at least one CPU is configured to execute processes in parallel with the at least one secure device.

Example 6 includes the subject matter of any of Examples 1-5, further comprising at least one memory controller, wherein the at least one CPU and the at least one secure device are coupled to the memory via the at least one memory controller.

Example 7 includes the subject matter of any of Examples 1-6, wherein the at least one CPU is further configured to power down the firmware storage device during the execution of the boot process and the at least one secure device is configured to store the at least one portion of the firmware payload at least in part by powering on the firmware storage device.

Example 8 includes the subject matter of any of Examples 1-7, wherein the at least one secure device is further configured to determine whether the at least one portion was stored successfully in the firmware storage device and notify the at least one CPU of whether the at least one portion was stored successfully via an interrupt.

Example 9 is a method of updating firmware of a computing device, the method comprising allocating, during execution of a boot process by at least one central processing unit (CPU), at least one secure memory area within a memory of the computing device; receiving, after the execution of the boot process by the at least one CPU, a firmware update request comprising a firmware payload; storing, by the at least one CPU, the firmware payload in the at least one secure memory area; reading, by at least one secure device, the firmware payload from the at least one secure memory area; and storing, by the at least one secure device, at least one portion of the firmware payload in a firmware storage device.

Example 10 includes the subject matter of Example 9, further comprising authenticating the firmware payload.

Example 11 includes the subject matter of either Example 9 or Example 10, wherein allocating the at least one secure memory area comprises associating the at least one secure memory area with the at least one secure device via hardware assisted remapping.

Example 12 includes the subject matter of any of Examples 9-11, further comprising storing, during the execution of the boot process, a copy of the firmware in the at least one secure memory area and servicing firmware function calls by accessing the copy of the firmware.

Example 13 includes the subject matter of any of Examples 9-12, further comprising executing, by the at least one CPU, a process in parallel with reading, by the at least one secure device, the firmware payload.

Example 14 includes the subject matter of any of Examples 9-13, wherein allocating the at least one secure memory area comprises allocating the at least one secure memory area via a memory controller and reading the firmware payload comprises reading the firmware payload via the memory controller.

Example 15 includes the subject matter of any of Examples 9-14, further comprising powering down the firmware storage device during the execution of the boot process, wherein storing the at least one portion of the firmware payload comprises powering on the firmware storage device.

Example 16 includes the subject matter of any of Examples 9-15, further comprising determining whether the at least one portion was stored successfully in the firmware storage device and notifying the at least one CPU of whether the at least one portion was stored successfully via an interrupt.

Example 17 is one or more non-transient computer readable media encoded with instructions that when executed by at least one central processing unit (CPU) and a at least one secure device cause a process for updating firmware to be carried out, the process comprising: allocating, during execution a boot process by the at least one CPU, at least one secure memory area within a memory of a computing device; receiving, after the execution of the boot process by the at least one CPU, a firmware update request comprising a firmware payload; storing, by the at least one CPU, the firmware payload in the at least one secure memory area; reading, by at least one secure device, the firmware payload from the at least one secure memory area; and storing, by the at least one secure device, at least one portion of the firmware payload in a firmware storage device.

Example 18 includes the subject matter of Example 17, wherein the process further comprises authenticating the firmware payload.

Example 19 includes the subject matter of either Example 17 or Example 18, wherein allocating the at least one secure memory area comprises associating the at least one secure memory area with the at least one secure device via hardware assisted remapping.

Example 20 includes the subject matter of any of Examples 17-19, wherein the process further comprises storing, during the execution of the boot process, a copy of the firmware in the at least one secure memory area and servicing firmware function calls by accessing the copy of the firmware.

Example 21 includes the subject matter of any of Examples 17-20, wherein the process further comprises executing, by the at least one CPU, a process in parallel with reading, by the at least one secure device, the firmware payload.

Example 22 includes the subject matter of any of Examples 17-21, wherein allocating the at least one secure memory area comprises allocating the at least one secure memory area via a memory controller and reading the firmware payload comprises reading the firmware payload via the memory controller.

Example 23 includes the subject matter of any of Examples 17-22, wherein the process further comprises powering down the firmware storage device during the execution of the boot process, wherein storing the at least one portion of the firmware payload comprises powering on the firmware storage device.

Example 24 includes the subject matter of any of Examples 17-23, wherein the process further comprises determining whether the at least one portion was stored successfully in the firmware storage device and notifying the at least one CPU of whether the at least one portion was stored successfully via an interrupt.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

The invention claimed is:

1. A computing device comprising:
   a memory;
   a firmware storage device storing firmware;
   at least one central processing unit (CPU) coupled to the memory and the firmware storage device and configured to:
      allocate, during execution of a boot process, at least one secure memory area within the memory;
      receive, after the execution of the boot process, a firmware update request comprising a firmware payload; and
      store the firmware payload in the at least one secure memory area; and
   at least one secure device coupled to the memory and the firmware storage device and configured to:
      read the firmware payload from the at least one secure memory area; and
      store at least one portion of the firmware payload in the firmware storage device.

2. The computing device of claim 1, wherein the at least one secure device is further configured to authenticate the firmware payload.

3. The computing device of claim 1, wherein the at least one CPU is configured to allocate the at least one secure memory area at least in part by associating the at least one secure memory area with the at least one secure device via hardware assisted remapping.

4. The computing device of claim 1, wherein the at least one CPU is further configured to:
   store, during the execution of the boot process, a copy of the firmware in the at least one secure memory area; and
   service firmware function calls by accessing the copy of the firmware.

5. The computing device of claim 1, wherein the at least one CPU is configured to execute processes in parallel with the at least one secure device.

6. The computing device of claim 1, further comprising at least one memory controller, wherein the at least one CPU and the at least one secure device are coupled to the memory via the at least one memory controller.

7. The computing device of claim 1, wherein the at least one CPU is further configured to power down the firmware storage device during the execution of the boot process and the at least one secure device is configured to store the at least one portion of the firmware payload at least in part by powering on the firmware storage device.

8. The computing device of claim 1, wherein the at least one secure device is further configured to:
 determine whether the at least one portion was stored successfully in the firmware storage device; and
 notify the at least one CPU of whether the at least one portion was stored successfully via an interrupt.

9. A method of updating firmware of a computing device, the method comprising:
 allocating, during execution of a boot process by at least one central processing unit (CPU), at least one secure memory area within a memory of the computing device;
 receiving, after the execution of the boot process by the at least one CPU, a firmware update request comprising a firmware payload;
 storing, by the at least one CPU, the firmware payload in the at least one secure memory area;
 reading, by at least one secure device, the firmware payload from the at least one secure memory area; and
 storing, by the at least one secure device, at least one portion of the firmware payload in a firmware storage device.

10. The method of claim 9, further comprising authenticating the firmware payload.

11. The method of claim 9, wherein allocating the at least one secure memory area comprises associating the at least one secure memory area with the at least one secure device via hardware assisted remapping.

12. The method of claim 9, further comprising:
 storing, during the execution of the boot process, a copy of the firmware in the at least one secure memory area; and
 servicing firmware function calls by accessing the copy of the firmware.

13. The method of claim 9, further comprising executing, by the at least one CPU, a process in parallel with reading, by the at least one secure device, the firmware payload.

14. The method of claim 9, wherein allocating the at least one secure memory area comprises allocating the at least one secure memory area via a memory controller and reading the firmware payload comprises reading the firmware payload via the memory controller.

15. The method of claim 9, further comprising powering down the firmware storage device during the execution of the boot process, wherein storing the at least one portion of the firmware payload comprises powering on the firmware storage device.

16. The method of claim 9, further comprising:
 determining whether the at least one portion was stored successfully in the firmware storage device; and
 notifying the at least one CPU of whether the at least one portion was stored successfully via an interrupt.

17. One or more non-transient computer readable media encoded with instructions that when executed by at least one central processing unit (CPU) and a at least one secure device cause a process for updating firmware to be carried out, the process comprising:
 allocating, during execution a boot process by the at least one CPU, at least one secure memory area within a memory of a computing device;
 receiving, after the execution of the boot process by the at least one CPU, a firmware update request comprising a firmware payload;
 storing, by the at least one CPU, the firmware payload in the at least one secure memory area;
 reading, by at least one secure device, the firmware payload from the at least one secure memory area; and
 storing, by the at least one secure device, at least one portion of the firmware payload in a firmware storage device.

18. The one or more computer readable media of claim 17, wherein the process further comprises authenticating the firmware payload.

19. The one or more computer readable media of claim 17, wherein allocating the at least one secure memory area comprises associating the at least one secure memory area with the at least one secure device via hardware assisted remapping.

20. The one or more computer readable media of claim 17, wherein the process further comprises:
 storing, during the execution of the boot process, a copy of the firmware in the at least one secure memory area; and
 servicing firmware function calls by accessing the copy of the firmware.

21. The one or more computer readable media of claim 17, wherein the process further comprises executing, by the at least one CPU, a process in parallel with reading, by the at least one secure device, the firmware payload.

22. The one or more computer readable media of claim 17, wherein allocating the at least one secure memory area comprises allocating the at least one secure memory area via a memory controller and reading the firmware payload comprises reading the firmware payload via the memory controller.

23. The one or more computer readable media of claim 17, wherein the process further comprises powering down the firmware storage device during the execution of the boot process, wherein storing the at least one portion of the firmware payload comprises powering on the firmware storage device.

24. The one or more computer readable media of claim 17, wherein the process further comprises:
 determining whether the at least one portion was stored successfully in the firmware storage device; and
 notifying the at least one CPU of whether the at least one portion was stored successfully via an interrupt.

* * * * *